US007162328B2

(12) United States Patent
Hornbaker et al.

(10) Patent No.: US 7,162,328 B2
(45) Date of Patent: Jan. 9, 2007

(54) TRACKING DEVICE FOR GRAIN

(75) Inventors: Robert H. Hornbaker, Champaign, IL (US); Volodymyr Kindratenko, Savoy, IL (US); David Pointer, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 11/299,309

(22) Filed: Dec. 9, 2005

(65) Prior Publication Data
US 2006/0136093 A1 Jun. 22, 2006

Related U.S. Application Data

(62) Division of application No. 10/882,937, filed on Jul. 1, 2004, now Pat. No. 7,047,103.

(51) Int. Cl.
*G06F 7/00* (2006.01)
(52) U.S. Cl. ...................................... 700/213; 700/213
(58) Field of Classification Search ................ 700/213, 700/225; 340/572.1, 572.8, 825.36, 825.49; 235/375, 385
See application file for complete search history.

(56) References Cited

U.S. PATENT DOCUMENTS

| 5,959,568 | A | 9/1999 | Woolley |
| 6,344,824 | B1 | 2/2002 | Takasugi et al. |
| 6,617,963 | B1 | 9/2003 | Watters et al. |
| 6,664,897 | B1 | 12/2003 | Pape et al. |
| 6,671,698 | B1 | 12/2003 | Pickett et al. |
| 6,691,135 | B1 | 2/2004 | Pickett et al. |
| 6,724,308 | B1 | 4/2004 | Nicholson |
| 6,760,654 | B1 | 7/2004 | Beck |
| 6,796,504 | B1 | 9/2004 | Robinson |
| 6,806,808 | B1 | 10/2004 | Watters et al. |
| 7,047,103 | B1 * | 5/2006 | Hornbaker et al. ......... 700/225 |
| 2001/0029996 | A1 | 10/2001 | Robinson et al. |
| 2002/0173042 | A1 | 11/2002 | Oolman et al. |
| 2004/0024603 | A1 | 2/2004 | Mahoney et al. |

FOREIGN PATENT DOCUMENTS

| EP | 1346622 A1 | 9/2003 |
| EP | 1346623 A1 | 9/2003 |
| EP | 1346624 A1 | 9/2003 |
| WO | WO 03081480 A1 | 10/2003 |
| WO | WO 03081482 A1 | 10/2003 |

OTHER PUBLICATIONS

Thurston, Jeff, "Genetically Modified Foods and Spatial Technology in Europe,"), obtained from the internet, Sep. 29, 2004, pp. 1-2 (text copy), website—http://www.vectorone.info/publish/gmo.htm.
http://www.rapidttp.com/transponder/tcoalsrt.html.
http://farmindustrynews.com/mag/farming_wireless_grain.

* cited by examiner

*Primary Examiner*—Khoi H. Tran
(74) *Attorney, Agent, or Firm*—Greer, Burns & Crain, Ltd.

(57) ABSTRACT

A tracking device for transported grain. A tracking device for grain comprises a radio-frequency identification (RFID) tag dimensioned to have a size approximating surrounding grain. The tag comprises a memory and an RF communication channel. Data is stored in the memory, comprising at least a time when the RFID tag was handled with surrounding grain and information sufficient to determine a location of handling at the time when the RFID tag was handled with the surrounding grain.

20 Claims, 14 Drawing Sheets

TRACKING DEVICE FOR GRAIN

PRIORITY CLAIM

This application is a divisional application of U.S. application Ser. No. 10/882,937, filed Jul. 1, 2004 now U.S. Pat. No. 7,047,103.

STATEMENT OF GOVERNMENT INTEREST

This invention was made with Government assistance under United States Department of Agriculture Grant No. Hatch 05-307 ACE. The Government has certain rights in the invention.

FIELD OF THE INVENTION

The present invention relates generally to the fields of agricultural grain tracking and food security.

BACKGROUND OF THE INVENTION

During a harvesting and production process for grain, the grain typically undergoes various grain handling stages. For example, a grain handling process may begin at a farm, where the grain is harvested and placed into a truck. The grain may be taken to an on-farm storage facility for storage, handling, and/or processing. Afterwards, the grain may be transported to long term storage, to a livestock facility site, or to an off-farm facility for processing. In later stages, the grain may be transported domestically or internationally to an end user and/or may be further processed. These grain handling stages are merely exemplary, and other grain handling stages are possible.

At any or all of these stages, however, the possibility exists for commingling of the grain with other product or foreign matter, or for other problems, such as damage, theft, etc. This concern has increased significantly in recent times with greater awareness of food security issues. It thus is desirable to have an indication of the history of a particular grain. To date, this problem is believed to have gone unsolved in the grain industry.

SUMMARY OF THE INVENTION

The present invention provides, among other features, a tracking device for grain. A preferred tracking device comprises a radio-frequency identification (RFID) tag dimensioned to have a size approximating surrounding grain. The tag comprises a memory and an RF communication channel. Data is stored in the memory, comprising at least a time when the RFID tag was handled with surrounding grain and information sufficient to determine a location of handling at the time when the RFID tag was handled with the surrounding grain.

DETAILED DESCRIPTION

There is an economic and food security value of physically tracking batch loads of grain and grain attributes from a harvest field to any point in a supply chain. For example, it would be beneficial to provide clear documentation of movement of grain from a beginning stage (a harvest field) to later stages. Processors would be able to increase operational efficiency and value through improved and timely information regarding the attributes of grain, both available (in storage) and arriving at processing facilities.

In terms of economic value, end users and/or consumers would be willing to pay a premium for food items that include clear documentation of their origin, as well as proof that a particular food item is segregated from unwanted ingredients or attributes. Clearly demonstrating a reduction or elimination of commingling of the grain with unwanted varieties, genetically modified organisms (GMOs), or other specific attribute characteristics would provide additional economic value to the grain, both at a wholesale and retail stage.

Further, it would be beneficial for purposes of food security to provide such tracking of the process for the grain. For example, increased concerns regarding bioterrorism illustrate the need for a system by which commingling of grain with other materials can be prevented. Also, it may be helpful for security purposes to trace back a particular grain through transportation and/or production systems.

Generally, a preferred embodiment of the present invention provides, among other features, a radio-frequency identification (RFID) tag for being deposited in a container with the grain. The tag is dimensioned to approximate a size of an individual grain, and comprises a memory and RF communication channel. The RFID tag further comprises data stored in the memory, the data including at least a time when the RFID tag was handled with surrounding grain, and information sufficient to determine a location of handling at the time the RFID tag was handled with the surrounding grain.

Preferred embodiments of the present invention provide a system to track agricultural grain, such as, but not limited to, corn, soybeans, and wheat, from harvest to later stages, including a final "whole" grain point in a supply chain process. The final point may include, for example, end users or processors.

Figure 14:
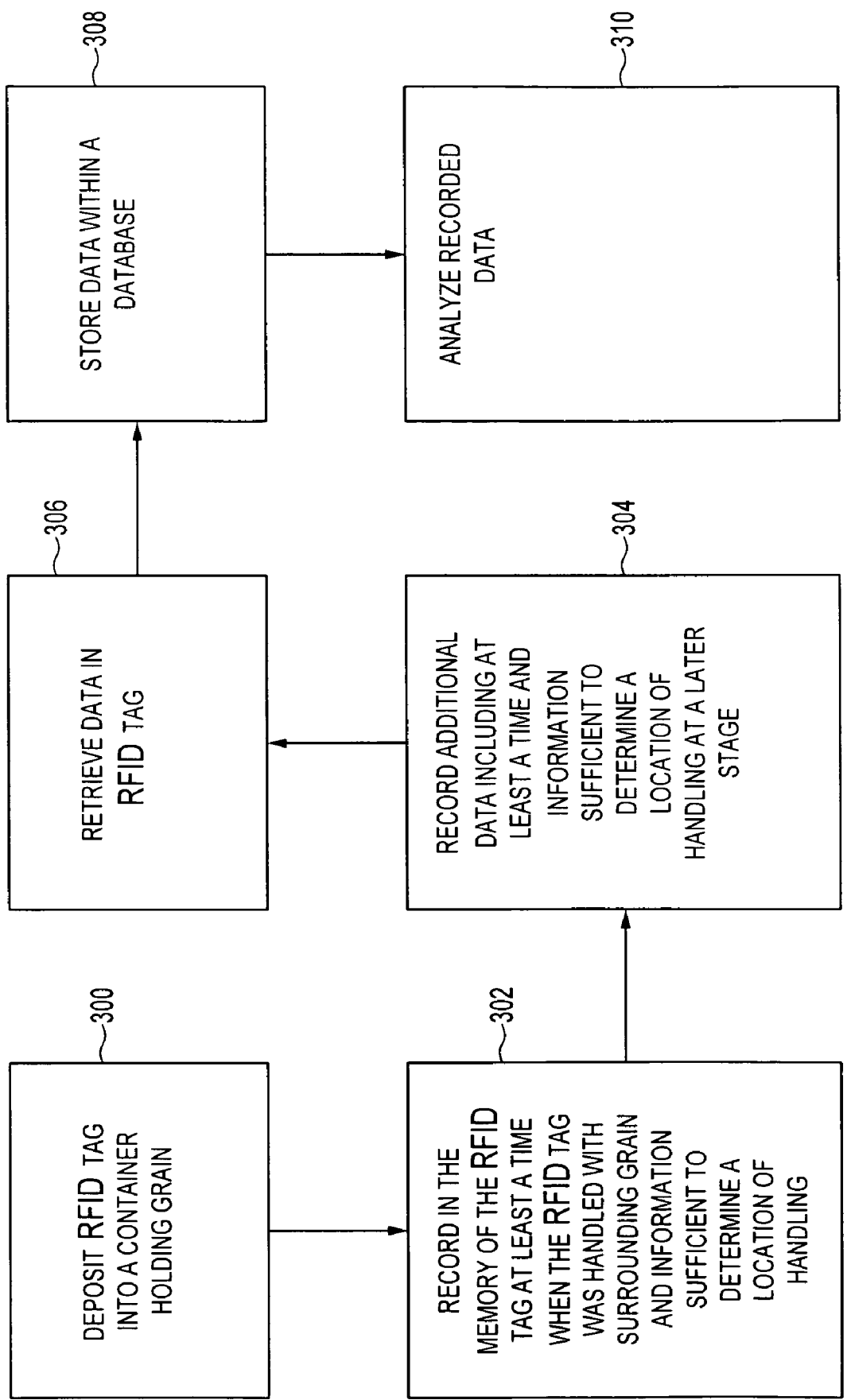
FIG. 14 shows an exemplary method for tracking transported grain according to a preferred embodiment of the present invention.

FIG. 14 shows an exemplary method of tracking transported grain. As shown in FIG. 14, in an exemplary tracking method, the RFID tag is deposited (step 300) into a container also holding the grain at a particular grain-handling stage. In this way, the RFID tag enters the grain flow among one or more grain-handling stages. A writer records (step 302) in the memory of the RFID tag at least a time when the RFID tag was handled with surrounding grain and information sufficient to determine a location of handling at the time when the RFID tag was handled with the surrounding grain. As a non-limiting example, the RFID tag may be recorded with an absolute (e.g., atomic clock) time. As a further non-limiting example, the RFID tag may be recorded with one or both of an absolute location (e.g., global positioning satellite (GPS)) of handling and an identification of a container into which the surrounding grain is, has been, or is to be deposited. Other data are possible for recording in the memory.

When the RFID tag is moved with surrounding grain from a particular grain-handling stage to a later stage in the grain handling process, at least the time and information sufficient to determine a location of handling preferably are further recorded in the RFID tag (step 304). This adds data to the overall record.

The recording process is repeated at each sequential stage, preferably (though it is possible to not record such information at a particular stage), until the grain reaches a final or intermediate stage. The data stored in the RFID tag can be retrieved (step 306) at an intermediate stage or at a final stage, and may be stored for analysis within a database (step 308), as a stand-alone database within the reader/writer and/or as a separate database, such as a central database. Preferably, it is possible to analyze the recorded data (step 310) at an intermediate stage and/or at an end stage of grain handling to provide a timeline or travel path for the grain among different stages.

Providing such a timeline or travel path, it is possible to determine if the grain stored with the RFID tag has deviated from a predetermined path, has been commingled with undesirable additional objects, or if data is inconsistent, which may indicate tampering. The database may include, for example, visualization software to perceive the timeline and/or tracking path more clearly.

A general purpose of this process stems from both the economic and food security value of physically tracking grain and grain attributes from the harvest field or later stage to any point in a processing chain. From the context of food security and economic value, the present invention preferably provides the ability to perform one or more of: 1) tracing back, for example using visualization tools, the entire transportation/movement of grain from an end user/processor to origination of seed stock, or to intermediate grain handling locations; 2) querying a database for information on identification/location of grain having specific attributes or characteristics; 3) linking to other spatial and/or non-spatial databases for identifying other attribute information associated with the grain; and 4) identifying alternative sources of food and export-safe grain, when potential contamination or bioterrorism results or events occur.

For example, by comparing the results stored in the memory of the RFID tag with those that would occur according to a predetermined path, it is possible to determine if and when the grain deviated from such predetermined path. This comparison may be made easier through the visualization tools.

A system for recording a history of transported grain is provided, which preferably includes one or more RFID tags, each being encoded with at least a time when the RFID tag was handled with surrounding grain and information sufficient to determine a location of handling at a time the RFID tag was handled with the surrounding grain. Additional data is possible, preferably including, but not limited to, a unique ID for the RFID tag. The system further includes a reader for encoding data to the RFID tags and a writer for extracting data from the RFID tags. The reader and writer may be embodied in a single device, referred to herein as a "reader/writer", or may be embodied in separate devices. Accordingly, though the application refers to a "reader/writer", it should be understood that a separate reader and writer may be substituted therefor. An alternative embodiment of a system includes the reader/writer, so that the system records data in RFID tags to track grain.

A preferred system also includes a database, which may be programmed into a microcomputer of the reader/writer as a stand-alone database and/or may be a separate database, such as a central personal computer (PC), which is linked to the reader/writer by suitable network connections. The database may include suitable storage and analysis tools, and may include visualization software for determining a static location of surrounding grain, for backtracking grain movement, for identifying buffer or isolation regions, and/or for detecting errors in a timeline or location path.

A preferred system also includes an apparatus or system for encrypting the data written to the RFID tags, such as encryption software. Encryption software can be included for writing the data in encrypted form to the RFID tags and the software for reading the encrypted data and translating it back to readable time, location, and serial number information.

A preferred system further includes a dispenser for dispensing the RFID tags at an early stage in the grain processing and/or a remover for extracting the tags at a later stage. The dispenser and/or remover can be integrated into various grain handling systems.

Figure 1:
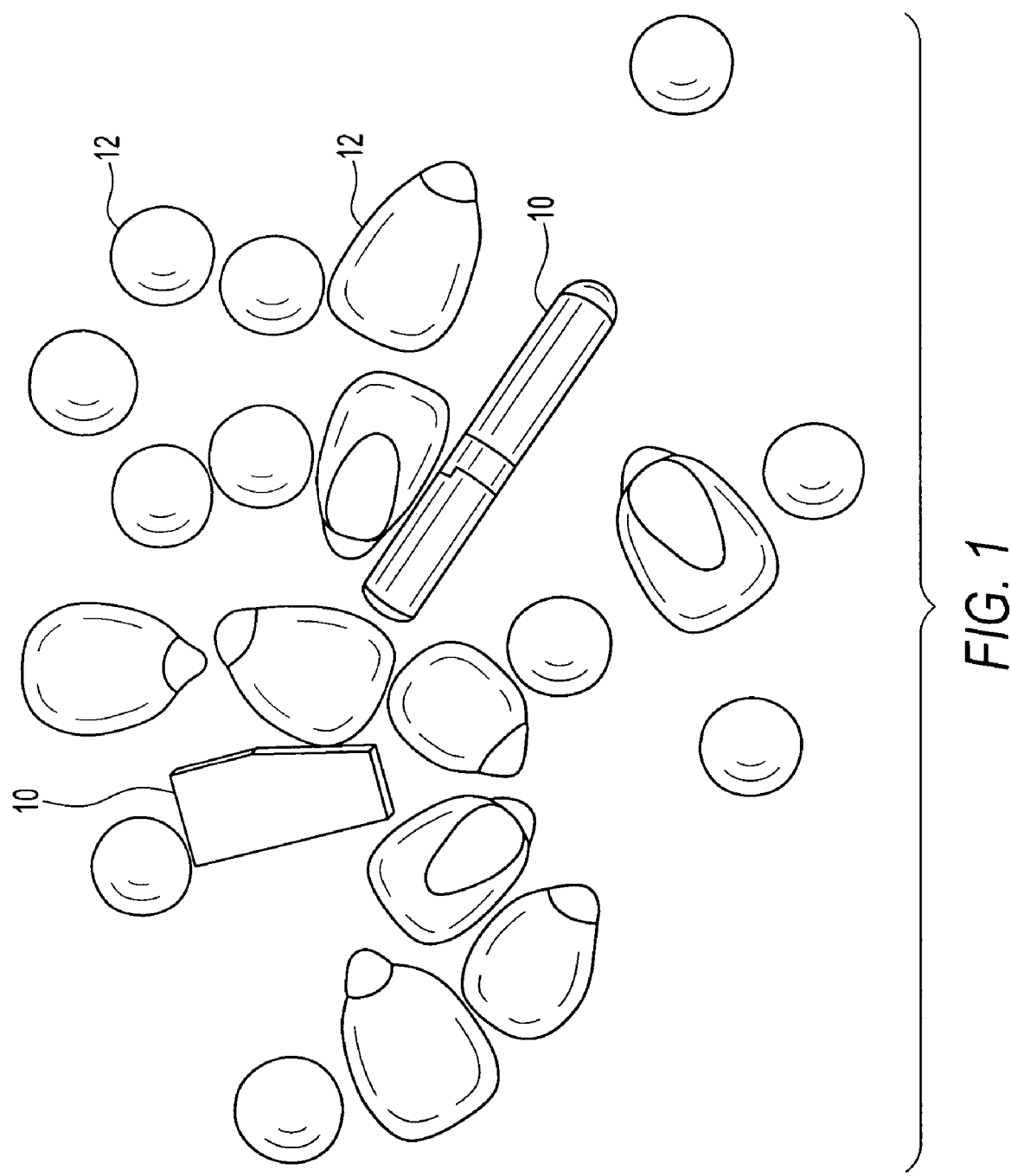
FIG. 1 shows exemplary radio-frequency identification (RFID) tags disposed among grain according to preferred embodiments of the present invention.

Referring now to the drawings, FIG. 1 shows non-limiting examples of RFID grain-tracking tags 10 having a size comparable to a size of surrounding corn and soybean grain 12. The RFID grain-tracking tag 10 (or, for simplicity, "RFID tag") is placed with and travels with the grain 12 being tracked. Preferably, the RFID tag 10 has a size approximating that of the surrounding grain 12 being tracked, and more preferably is substantially the same size, shape, and weight of the surrounding grain, so that the grain remains with its host containers (e.g., bushels) of grain as the grain moves from a first stage (such as from the field) to a later stage (such as an extraction point). In other words, the RFID tag 10 becomes part of the flow of the grain 12.

Preferably, the RFID tag 10 has a packaging or casing that is magnetic, durable, and non-toxic. Magnetic components or portions are preferred for the casing, or within the casing, so that the RFID tag 10 may be more easily extracted from the surrounding grain 12. Further, the RFID tag 10 preferably is durable, so that the RFID tag's packaging does not wear appreciably after several (e.g., thousands of) cycles of reuse. Additionally, the casing or packaging should be non-toxic, so that what little wear does occur as the RFID tag 10 jostles with the surrounding grain 12 does not contaminate the grain.

As shown, the RFID tag 10 may have a variety of shapes and sizes. Further, while it is preferred that the RFID tag 10 be substantially the same size as the surrounding grain 12, it is contemplated that other sizes for the RFID tags are possible. In a preferred embodiment, the RFID tags 10 have a similar outer texture to that of the surrounding grain 12, but this is not required. Similarity in size and/or shape of the RFID tag 10 with the surrounding grain 12, however, allows the RFID tag to more easily be deposited with and travel with the surrounding grain as it travels among various processing stages.

Figure 2:
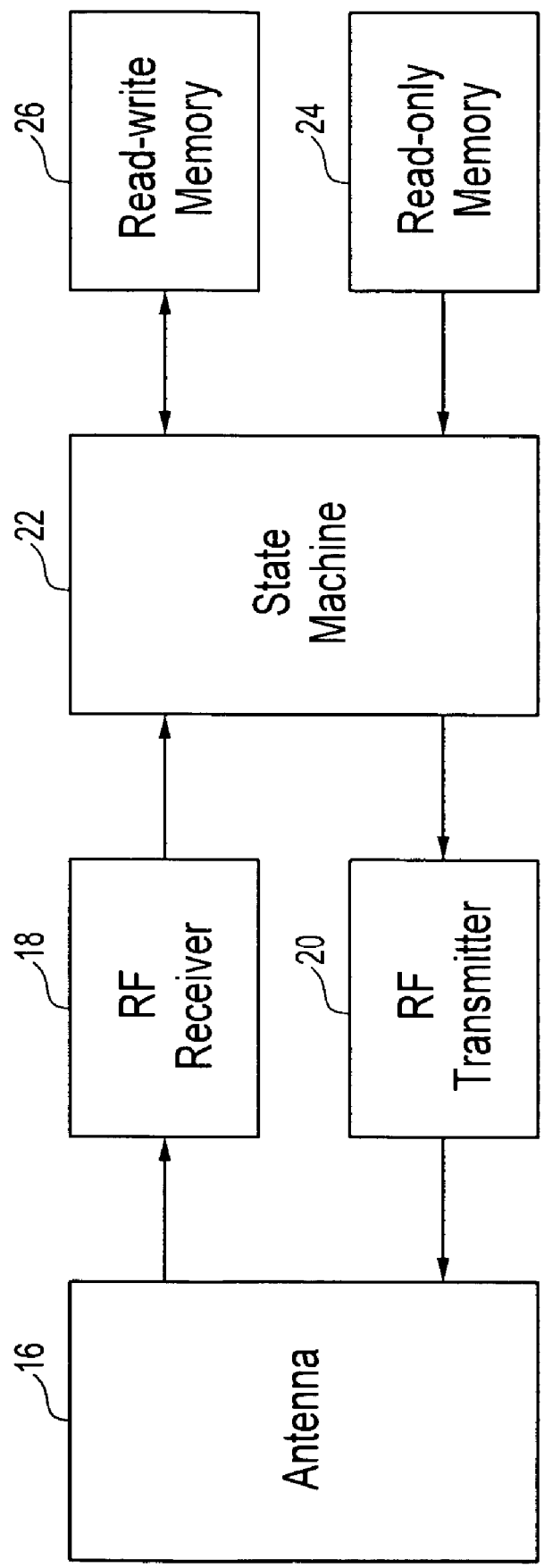
FIG. 2 shows an exemplary architecture of an RFID tag.

FIG. 2 shows architecture of a preferred RFID tag 10. The RFID tag 10 preferably includes at least a memory and an RF communication channel. The RFID tag 10 preferably is a passive RFID device. In other words, the RFID tag preferably does not contain a battery, and is powered solely by an electromagnetic field generated by a reader/writer 14 (shown by example in FIG. 4). However, it is contemplated that a battery or other power source could be provided in the casing of the RFID tag 10, though it may be necessary in certain cases to account for the resulting additional weight, for example.

An antenna 16 preferably receives and stores electromagnetic energy transmitted from the reader/writer 14. After sufficient energy has been received and stored, the remainder of the architecture becomes active. The density of a transmitter of the reader/writer 14 in terms of the message bit stream from the reader/writer to the RFID tag 10 should be sufficient to keep the circuitry of the RFID tag powered throughout a given operation, though this may not be necessary if the RFID tag includes a battery.

The antenna 16 is electrically coupled to an RF receiver 18 and to an RF transmitter 20 for receiving signals from the transmitter of the reader/writer 14, and/or sending signals to the reader/writer, respectively. In an exemplary embodiment, a state machine 22 coupled to both the RF receiver 18 and the RF transmitter 20 controls sequencing and timing of at least three operational commands:

1. If the RF receiver 18 successfully receives and decodes a "read ID" command from the reader/writer 14, the state machine 22 reads the RFID tag's 10 identification number (ID) from a non-volatile read-only memory (ROM) 24 and sends this ID back to the reader/writer via the RF transmitter 20 and the antenna 16.

2. If the RF receiver 18 successfully receives and decodes a "read data" command from the reader/writer 14, the state machine 22 reads the RFID tag's ID from the ROM 24, appends all data in a read-write memory 26 to the ID, and sends the composite message to the reader/writer via the RF transmitter 20 and the antenna 16. Preferably, the read-write memory 26 is non-volatile, particularly if no battery is provided.

3. If the RF receiver 18 successfully receives and decodes a "write data" command from the reader/writer 14, the state machine 22 writes the received bits into the non-volatile read-write memory 26.

The capacity of the ROM 24 is sufficient to contain the RFID tag's 10 ID. This memory space preferably is fixed and set at the time the RFID tag 10 is manufactured. In other words, it is preferred that the RFID tag's 10 unique ID be absolute and unchangeable. The capacity of the read-write memory 26 should be sufficient to at least contain the maximum number of sets of data that the RFID tag 10 is expected to receive during a single grain-tracking cycle. For example, if the RFID tag 10 is designed to track grain through eleven stages, the RFID tag should have at least sufficient capacity in the read-write memory 26 to contain eleven sets of data.

Beginning with the first stage to which the grain is to be processed, detailed identification/tracking information is written to each RFID tag 10. Each RFID tag 10 has its own unique ID. The RFID tags 10 are deposited in a container 28 (see FIG. 10) housing the grain 12 (such as a bin) during transport of the grain into the container (for example, during harvest). The RFID tags 10 preferably are deposited at a predetermined time or volume rate, such as one tag per every fifty bushels of grain 12 harvested.

At the point of deposit the RFID tags 10, through the reader/writer 14 (a radio-frequency (RF) device), are encoded in the read-write memory 26 with a time when the RFID tag was handled with the surrounding grain, and information sufficient to determine a location of handling at the time when the RFID tag was handled with the surrounding grain. For example, the time when the RFID tag 10 was handled with the surrounding grain 12 may be a time, such as the current atomic clock date/time. The recorded time may be before or after the RFID tag 10 is deposited with the grain 12, and after the RFID tag is deposited this time may be before, during, or after the surrounding grain is deposited in the container 28.

The information sufficient to determine a location of handling at the time when the RFID tag 10 was handled with the surrounding grain 12 may include, for example, an absolute location, such as current global positioning satellite (GPS) coordinates, and/or an identification of the container 28 in which the grain and the RFID tag are currently located or to be deposited. Such identification may include, for example, the serial number of a combine. In addition to these encoded data, the read-write memory 26 may also be encoded with additional data, such as, but not limited to, an event number for a particular stage in processing, a lot number, a rate of insertion of the RFID tag 10, a moisture content of the surrounding grain 12, other grain attribute data, etc.

At later stages, such as during transfer to a grain cart and into a truck, the RFID tags 10 may be encoded with additional data including a time when the RFID tag was handled with the surrounding grain 12, and information sufficient to determine a location of handling at the time when the RFID tag was handled with the surrounding grain. For example, location information may include new container identification (e.g., grain cart serial number, semi truck serial number, etc.).

Figure 3:
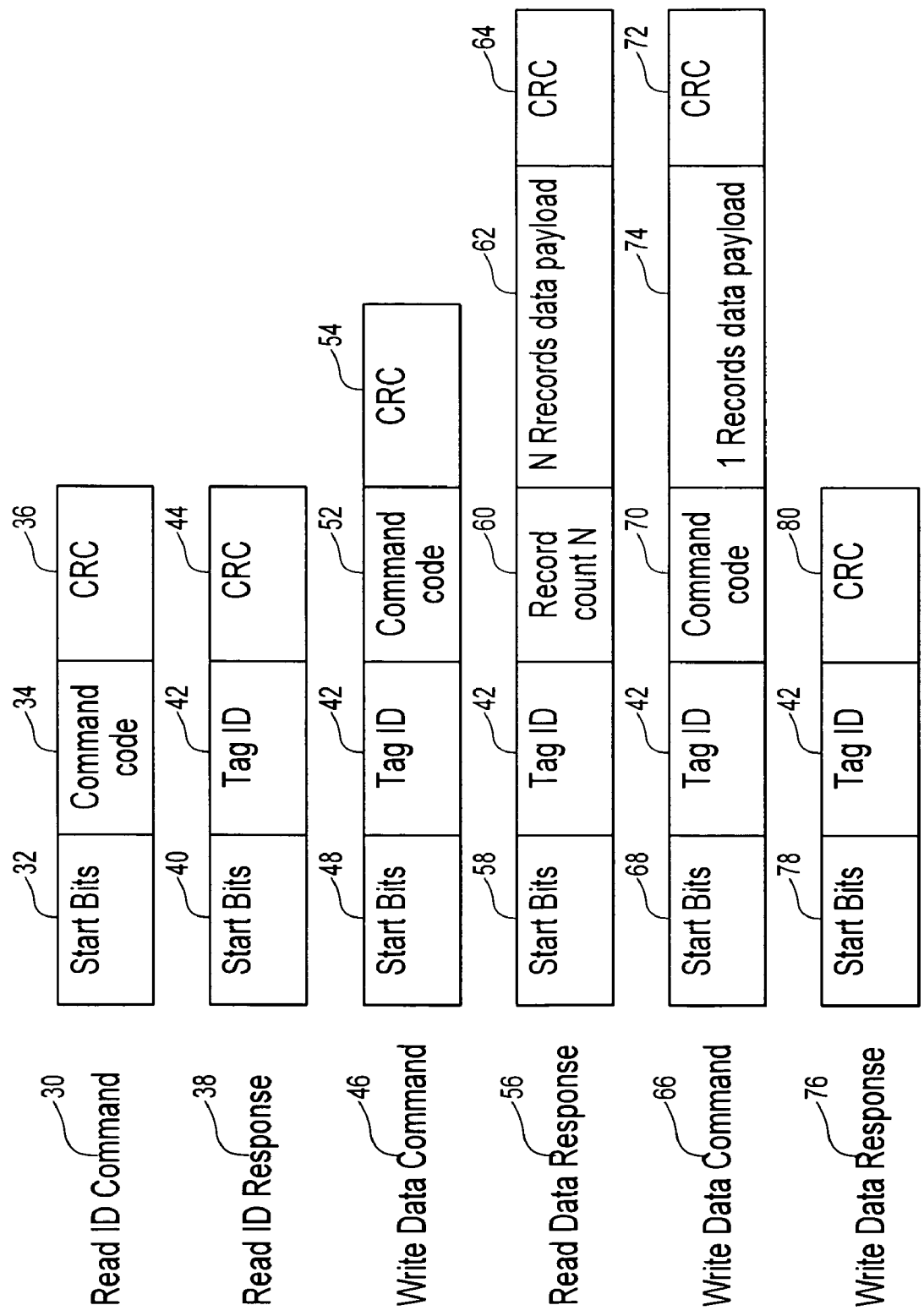
FIG. 3 shows sample message formats for messages between an RFID tag and a reader/writer.

FIG. 3 shows exemplary command messages sent by the reader/writer 14 and responses of the RFID tag 10. A read ID command 30 includes start bits 32 indicating the command, the command code 34 (e.g. "read ID" code), and a cyclic redundancy check (CRC) error detection code 36. The start bits 32 indicate a start of a message condition to a given receiver, either the RFID tag 10 or the reader/writer 14. The RFID tag ID contains the unique tag ID bits for a given RFID tag 10. A read ID response 38 from the RFID tag 10 includes start bits 40, the RFID tag's ID 42 (from the ROM 24), and a CRC 44.

For reading data, an exemplary read data command 46 includes start bits 48, the RFID tag ID 42, a command code (e.g., "read data") 52, and a CRC 54. In response, a read data response 56 includes start bits 58, the RFID tag ID 42, a record count N 60 and N records data payload 62 from the read-write memory 26, and a CRC 64. Similarly, a write data command 66 includes start bits 68, the RFID tag ID 42, a command code ("write data" code) 70, one records data payload 72, and a CRC 74. The write data response 76 includes start bits 78, the RFID tag ID 42, and a CRC 80.

The reader/writer 14 preferably is linked to a current atomic clock date/time, and current GPS coordinates, as well as a serial number of the particular container 28. A single record of data payload preferably includes at least time stamp and location data from a GPS receiver linked to the reader/writer 14, as well as any other data defined for this system, such as that described above. The reader/writer 14 preferably is linked to both a yield monitor and the GPS for this purpose.

Figure 4:
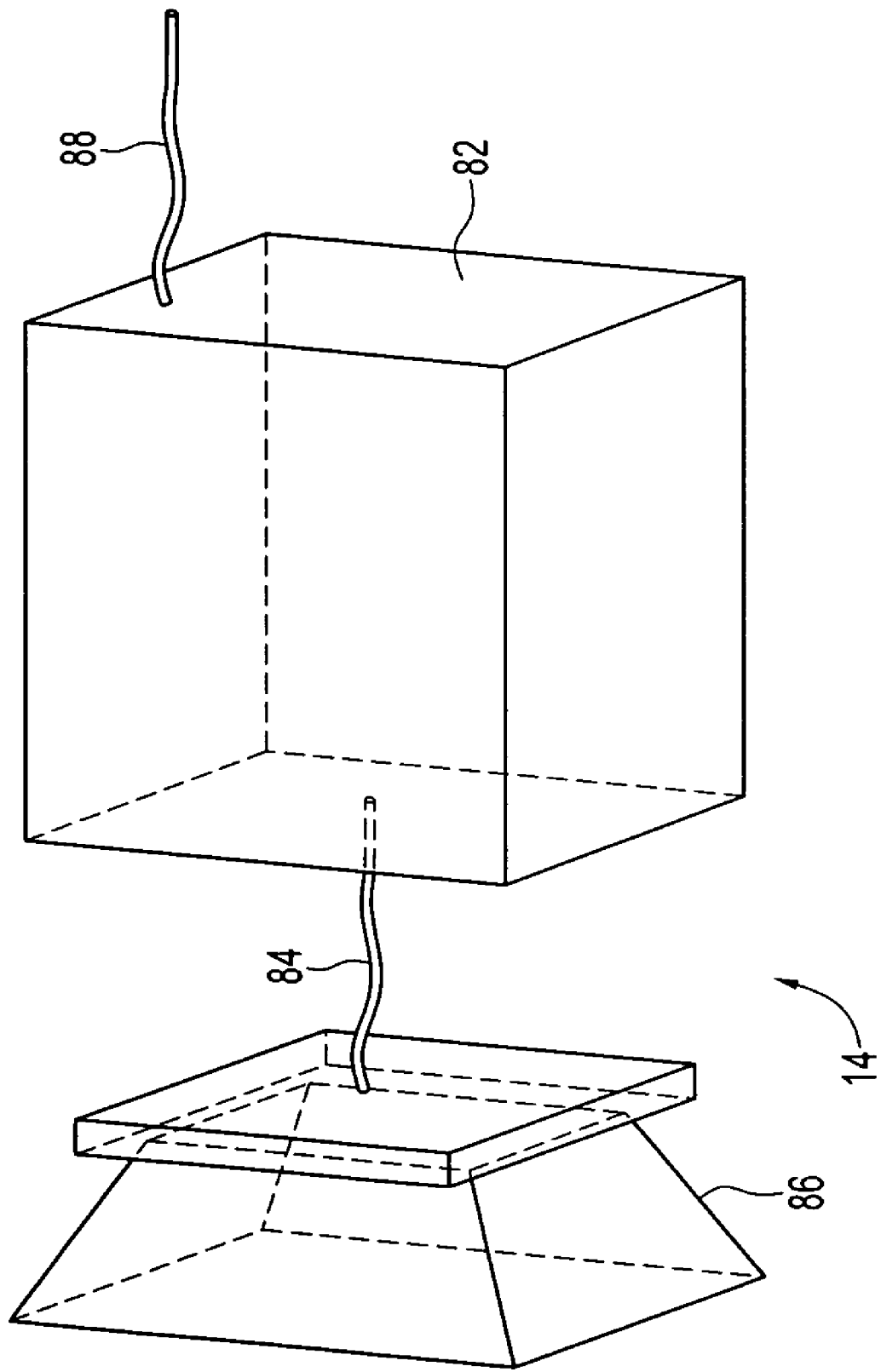
FIG. 4 shows a reader/writer according to an embodiment of the present invention.

FIG. 4 shows an exemplary reader/writer 14 provided for encoding data within the RFID tag 10, and for reading data stored in the RFID tag's ROM 24 and read-write memory 26. The packaging for the reader/writer 14 is preferably suitable for the expected environmental conditions at the locations in which it is to be used, but can vary significantly in terms of its shape, size, weight;, etc. Preferably, the reader/writer 14 is embodied in a handheld or portable device. Power for the reader/writer 14 may be provided by, for example, standard house current (120 VAC), batteries, solar power, etc.

The exemplary reader/writer 14 shown includes an electronics box 82, which may be housed within a suitable casing. The electronics box 82 may include, for example, the components shown in FIG. 5 and other components as may be desired. An antenna cable 84 couples the electronics box 82 to an RF antenna 85 for reading to and writing from the RF antenna 16 of the RFID tag 10. The reader/writer 14 may also include, for example, an antenna for receiving GPS and/or atomic clock data for recording with the RFID tag 10. This antenna may be part of or separate from the RF antenna 86. As shown, the RF antenna 86 may be detachable, or instead may be integrated into the reader/writer 14. Power and control cables 88 coupled to the electronics box 82 provide power and manual or automatic control for the components within the reader/writer 14.

Figure 5:
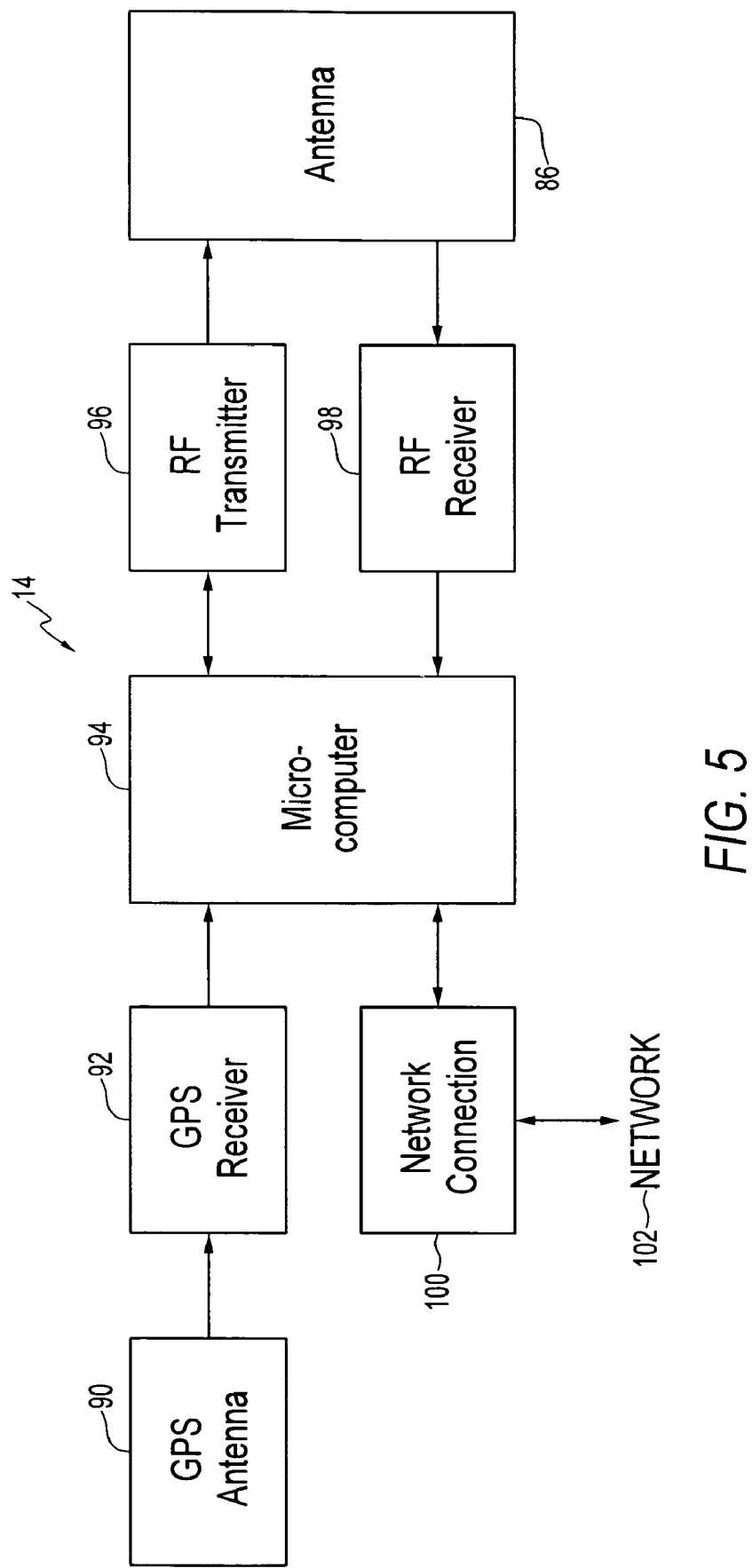
FIG. 5 shows an exemplary architecture of a reader/writer.

FIG. 5 shows an exemplary architecture for the reader/writer 14. A GPS antenna 90 and a GPS receiver 92 are provided for receiving and processing signals from a GPS. These processed signals are sent to a microcomputer 94 coupled to the GPS receiver 92 for processing data. The microcomputer 94 also is coupled to an RF transmitter 96 and an RF receiver 98, both of which are electrically coupled to the RF antenna 86 for sending or receiving electromagnetic signals. Further, the microcomputer 94 preferably is coupled to a suitable network connection 100 for uploading or downloading data to or from a central system or network 102 for analysis or storage. The central system or systems 102 may be one or more computers at one or more locations, for example one system at a farm and another at a processor facility. The one or more systems may communicate via the network. The connection 102 may include but is not limited to a wireless connection (such as 802.11 standard connection, Bluetooth, cellular, etc.), controller area network (CAN) bus, Ethernet, modem, or other suitable connection. Additionally or alternatively, the microcomputer 94 may include suitable stand-alone database software for analysis and/or storage.

The microcomputer 94 of the reader/writer 14 receives a time stamp and location data through the GPS antenna 90 and the GPS receiver 92. When the RFID tag 10 is detected by, for example, obtaining a valid ID from the RFID tag via the antenna 86 and the RF receiver 98, the current time stamp, location data, and any other defined system data are encoded to the RFID tag via the RF transmitter 96 and the antenna. The microcomputer 94 may also store all of the records that it has received in a stand-alone database. If the network connection 100 is provided, these data may additionally or alternatively be transferred to a centralized or regional computer system for analysis or storage.

Figure 6:
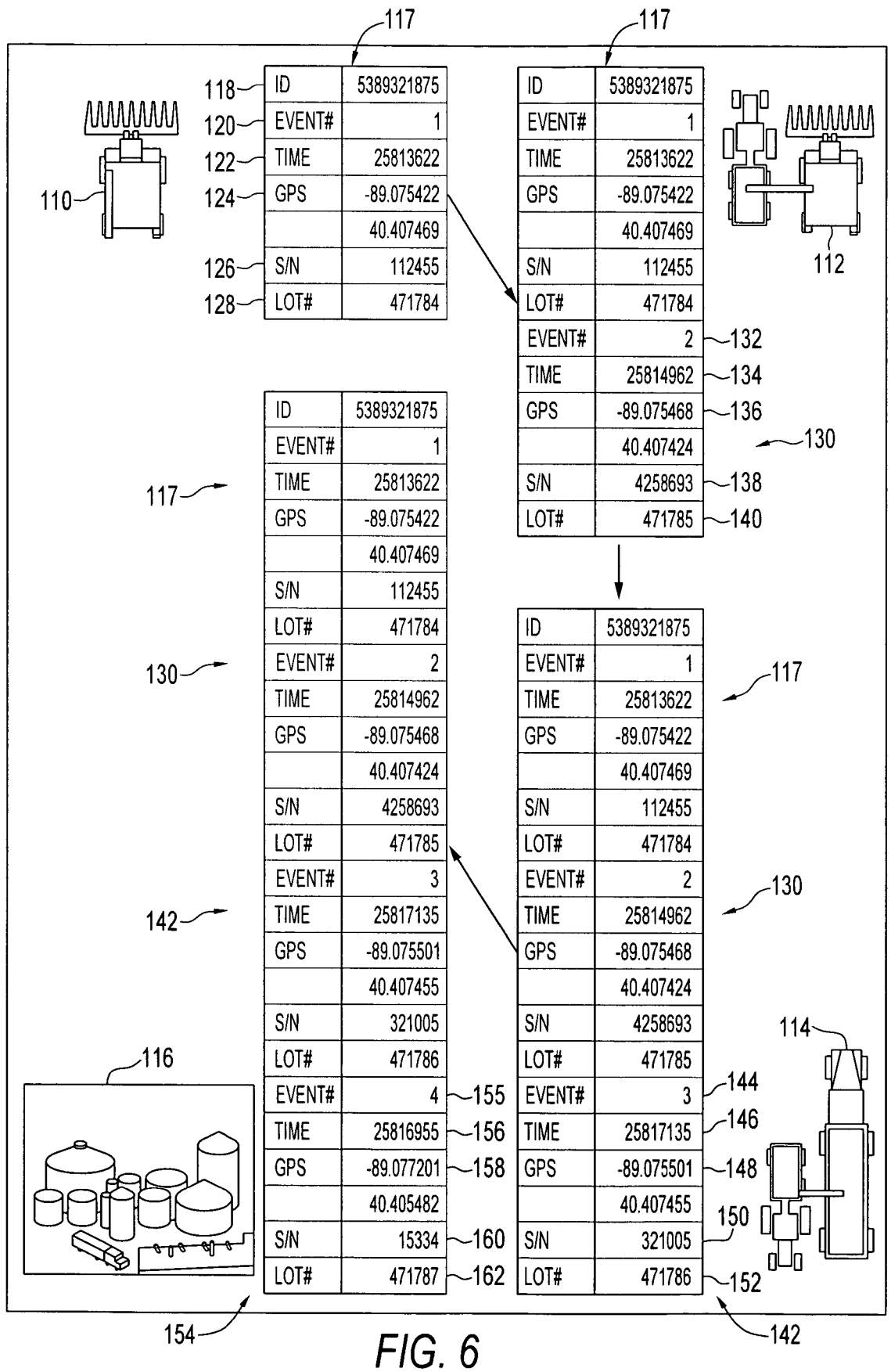
FIG. 6 shows sample data sets for an RFID tag encoded at four sequential stages of grain processing.

As explained above, the RFID tag 10 preferably is encoded at least with a unique hard-coded ID within the ROM 24, and with time and location information in the read-write memory 26 by the reader/writer 14. Such data and other data (event number, lot number, etc.) may be stored as individual sets of data within the read-write memory 26. For example, FIG. 6 shows exemplary data stored in the RFID tag 10 for grain as it moves with surrounding grain in four stages: Stage 1—harvest 110; Stage 2—transfer to a tractor/grain-cart 112; Stage 3—transfer from the tractor/grain-cart to a truck 114; and Stage 4—loading of the truck to a storage bin 116.

A first set of encoded data 117 for Stage 1 110 includes the hard-coded RFID tag ID 118, and data stored in the read-write memory 26, including: an event number 120; a time 122 (e.g., atomic clock time); an absolute location 124 (GPS latitude and longitude coordinates); a serial number 126 identifying a container in which the grain 12 is currently stored (such as the serial number for a particular vehicle or particular equipment); and a unique lot number 128 for each transfer event. A second set of data 130 is appended to the first set of data 117 and adds the new event number 132, the time 134, the GPS location 136, serial number 138, and lot number 140 for Stage 2 112. Similarly, a third data set 142 further appends an event number 144, atomic time 146, GPS location 148, container ID 150, and lot number 152. Finally, a fourth data set 154 appends to all of the data from the other three data sets 117, 130, 142, an event number 155, an atomic time 156, GPS location 158, container ID 160, and lot number 162 for Stage 4 116.

As shown in FIG. 6, additional encoding of data does not replace previously-encoded data within the read-write memory 26, but instead preferably adds data to the previously-encoded data, creating a complete record of time, location, and container identification for every stage in the grain's transport and processing. It is possible that data for intermediate steps may be removed at some stage, or may not be encoded. However, it is preferred for optimal benefit of the present invention that data be recorded at each stage of the transport for the grain 12. Thus, at any given moment of time, the RFID tag 10, and particularly the read-write memory 26, will contain a history of product movement, storage, and processing, including at least time and location of transactions and identification of relevant equipment, storage facilities, etc.

For example, a typical system for grain transport may include eleven stages of recording and/or reading tracking information. Stage 1, for example, may be harvest, and Stage 11 may be the last whole grain point in the supply process, such as a grain processor or export. Though at any of the stages, it may be possible to read and write data to/from the RFID tag 10, insert new RFID tags and/or extract RFID tags, in a preferred overall process, such as for tracking the grain 12 between Stages 1–11, the RFID tags are inserted at Stage 1 and extracted at Stage 11. Further, while reading from or writing to the encoded RFID tags 10 need not occur at all of the intermediate stages, it may be possible to do so at all potential points of tracking information. Such a process may be preferable for security reasons, etc.

Beginning with Stage 1 (harvest) the RFID tag 10 may be encoded with, in addition to its own unique ID, the current atomic clock date/time, the current GPS coordinates, and serial number of the combine. The RFID tags 10 may be deposited, for example, in the combine grain bin during harvest at a particular rate, such as one for every fifty bushels of grain harvested. At Stage 2 (transfer to a tractor/grain-cart) and Stage 3 (transfer from the tractor/grain-cart to a truck), the RFID tags 10 preferably are again re-encoded with the current time, location coordinates, and container ID (of the tractor/grain cart, and truck, respectively).

In this exemplary process, Stages 4–6 include the on-farm storage and handling portion of the system. The RFID tags 10 preferably are encoded with additional time, coordinate, and container ID information at Stage 4 when leaving the truck to enter a first grain holding bin (in which the GPS coordinate is preferably a fixed location for the site, with an ID number for each bin at the site). Further, in Stage 5, the grain 12 (for example, wet corn) may be transferred to a dryer, and in Stage 6, to a final holding bin. In Stages 5 and 6 the RFID tags 10 preferably are again recorded with the time and container ID at transfer (since, in this example, the GPS coordinates are fixed at this site) thereby allowing calculation of storage time in each bin, and the drying time.

Stage 7 (transfer from the final holding bin to a truck) preferably is similar to Stage 3 (transfer from the tractor/grain-cart to the truck), with the transfer time, serial number of the truck, and site GPS coordinates being recorded. From this point, the grain 12 and the RFID tags 10 may move on to a Stage 8a location (a rural elevator) where processor encoding and reading is performed similarly to that of Stages 4–6, as the grain is in storage and transfer within a particular fixed site. Alternatively, the grain 12 may be moved directly to a Stage 8b (livestock facility site), where there will again be encoding of a time and location of arrival at the site. At this stage, it may be useful to extract and read the RFID tags 10.

Next, the grain 12 goes through Stage 9 (transfer to another truck), and then on to Stage 10 (terminal or processor), where again encoding, reading, and extraction of the RFID tags 10 may occur. Alternatively, the grain 12 may proceed to Stage 11 (export), where extraction can occur at the international processor, for example.

At any given moment of time (i.e., at any particular stage, or between stages), the RFID tags 10 preferably each contain a complete history of product movement, storage, and processing, including time and location of transactions, and serial numbers or other identification of relevant equipment, storage facilities, etc. As described above, this information can be extracted from the reader/writer 14 or other device, and may be stored therein or sent to one or more central computers for storage and/or processing. For example, an external geographical information system (GIS) and non-spatial database may be provided for referencing other attribute, time, and spatial data layers. The database may be used, for example, to store the received data from the RFID tags 10, sort the data, and/or analyze the data.

One preferred method of analyzing and/or displaying the RFID tags' data is by using a visualization tool for static identification of the grain 12, preferably with attribute location information (such as in storage). For example, a display 164 (see FIG. 7) coupled to the database (for example, as part of a PC) may include a visual depiction of one or more stages of the grain's transport. By linking the database with the display, a particular area of the visual depiction may be highlighted to indicate that the grain 12 surrounding the RFID tag 10 is located at a particular position. Similarly, such visualization may include identification of a particular container, particular lot, and/or absolute location, using a map, etc.

Figure 7:
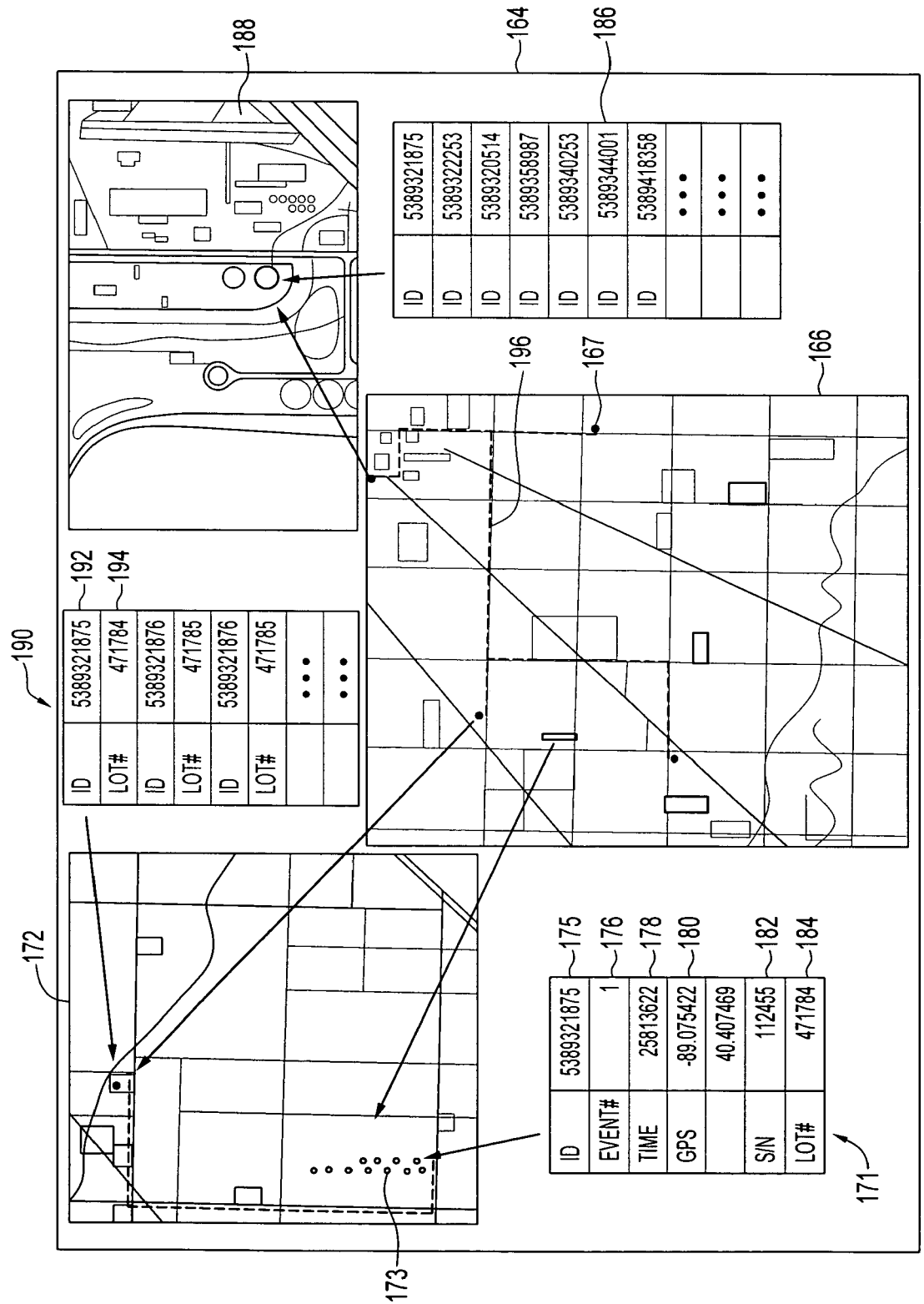
FIG. 7 shows a display produced from visualization software of a database according to a preferred embodiment of the present invention.

This visualization may be expanded, for example, by identifying multiple locations extracted from the RFID tags 10 to backtrack movement of the grain 12 among its different stages. For example, FIG. 7 shows an exemplary display 164 including a visual depiction from farm field harvest to farm storage to a processing plant or Stages 1–10 described above. This depiction may be, for example, an overlay 166 of the unique RFID tag recording points on a satellite image or other geographic referenced maps. By highlighting particular locations within the depicted lots (e.g., by linking the visualization with absolute coordinates) and highlighting the extracted coordinates in the display, individual points for a particular RFID tag 10 can be displayed on the display 164. Individual lots or tags may be selected, for example, by highlighting icons 167 on the display 164 indicating RFID tag recording points.

An individual tag record 171 can be displayed, as shown in an enlarged farm field view 172 in FIG. 7, by selecting, for example by highlighting, an icon 173 on the field view. The enlarged field view 172 is created by enlarging a selected portion of the overlay 166. The exemplary individual record 171 shows a unique tag ID number 175, event number 176, atomic clock time of harvest 178, GPS coordinates 180, a serial number of a combine 182, and a unique lot number 184. Moreover, a complete list 186 of RFID tags in storage may be displayed, as shown at an enlarged processor level image 188. The ID numbers from the RFID tags 10 may then be linked to the database for displaying the compete history of the first to last stage events, time, location, etc. As one example, a record 190 shows a list of RFID tag IDs 192 and their associated lot numbers 194 at a location on the enlarged field view 172.

Further, by connecting the displayed points a general path of movement for the grain 12 can be depicted on the display 164, as demonstrated with dotted points 196 for the farm storage to processor transportation shown in FIG. 7. Such backtracking can effectively illustrate movement of the grain 12, when and where the grain was stored, and/or origination of the grain. Further, visualization software may be provided for identifying buffer/isolation regions, for example, in the field, storage, and/or transport routes for segregating high-value or potentially contaminated grain.

Providing a unique ID for each RFID tag 10 in the ROM 24, and encoding the RFID tag at various stages without rewriting the previously-written data before extraction, reduces or eliminates the potential to manipulate or falsify the encoding information. By coding the time, location, and ID for equipment used, built-in redundancy is provided, which allows checking for errors in terms of the timeline of RFID tag read/write information, location/spatial error checks, reference to appropriate harvest, transport and storage equipment, and timeline reference to appropriate batch loads, etc. Use of visualization such as that described above enables, for example, visualization of time and spatial movement of grain, and depicts origination of any data that may be outside prescribed control parameters.

Figure 8:
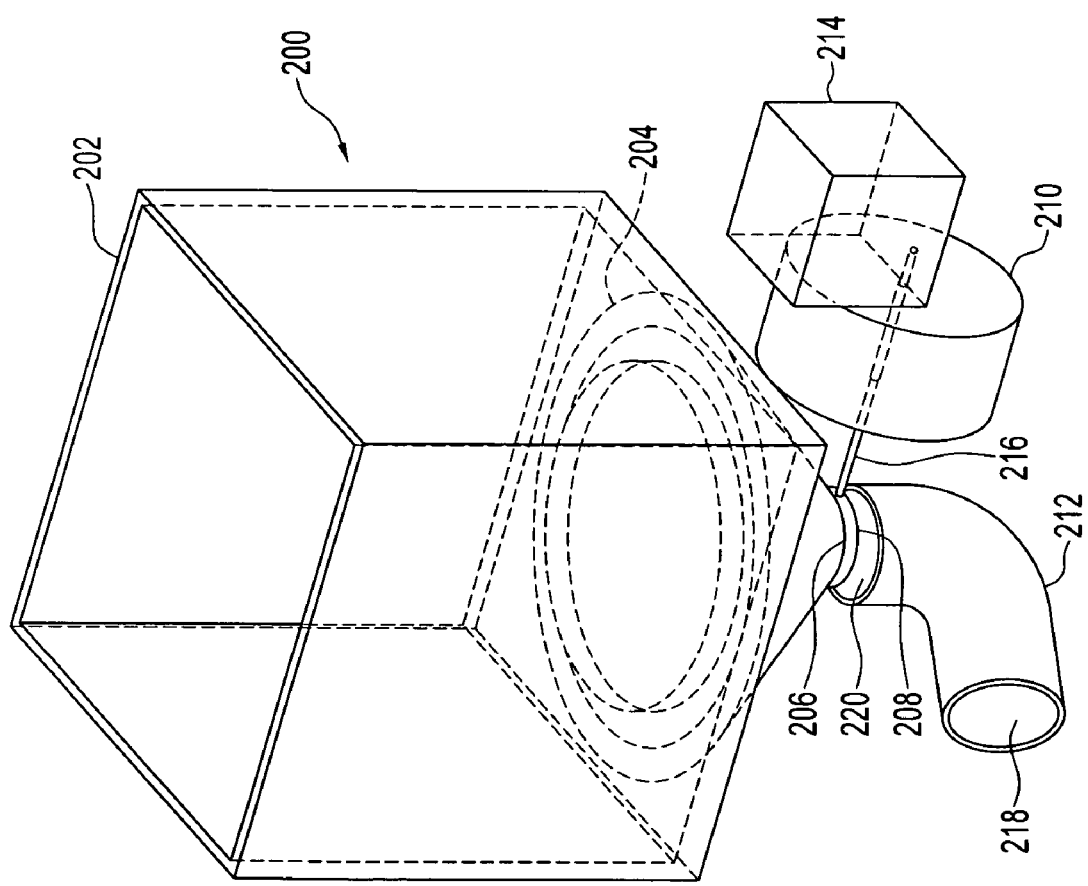
FIG. 8 shows an exemplary dispenser for RFID tags, according to a preferred embodiment of the present invention.

The RFID tags 10 may be deposited within the containers 28 housing the grain 12 (such as, but not limited to, storage bins, trucks, combines, etc.) in any suitable manner. Further, the RFID tags 10 may be extracted at a later stage in any suitable manner. A preferred RFID tag 10, as explained above, includes an at least partially magnetic casing or other magnetic component to make it easier to deposit and/or extract the RFID tags. FIG. 8 shows an RFID tag dispenser 200 according to an embodiment of the present invention. Generally, the dispenser 200 includes a tank 202 for containing the RFID tags 10 to be dispensed, including a hopper 204 at its bottom with an opening 206 large enough to allow passage of the RFID tags (preferably one at a time), a surface such as a dispensing door 208 that selectively opens and closes the opening to dispense the RFID tags from the tank, a controlling device such as a solenoid 210 to control opening and/or closing of the dispensing door, a tags guide 212 connected to the opening of the hopper, which directs the RFID tags for dispensation, and control electronics 214 for controlling the solenoid.

Preferably, the dispensing door 208 includes a surface embodied in a disk that is dimensioned and positioned to cover the opening 206 of the hopper 204 at the bottom of the tank 202. For selectively opening and closing the dispensing door 208, the disk is connected to a rod 216, which at an opposing end is inserted into the solenoid 210. When a positive current is applied to the solenoid 210 from the control electronics 214, the rod 216 is pulled in (towards the solenoid) and the disk of the dispensing door 208 opens the opening 206 at the bottom of the hopper 204. In this way, the RFID tag 10, preferably a single tag, is released into the tags guide 212, which preferably is embodied in a hollow pipe or chute, having an opening 218 at one end in communication with the opening of the tank, and at an opposing end having an opening 220 for dispensing the RFID tags.

Conversely, when a negative current is applied to the solenoid 210 from the control electronics 214, the rod 216 is pushed out (away from the solenoid), thus moving the disk of the dispensing door 208 and thus closing the opening 206 at the bottom of the hopper 204. The tags guide 212 preferably is positioned and configured to direct the released RFID tag 10 to an appropriate location (via, e.g., gravity or other direction mechanism, such as a vacuum) to be released into a grain stream before or during a dispensation of the grain 12 into the container 28.

The control electronics 214, preferably stored in a control box, provide the positive and negative currents to the solenoid 210 based on a control program. The control electronics 214 may also provide an interface for instituting a frequency of release of the RFID tags 10, and may further interface with other system components. For example, an operator can program the control electronics 214 to release a specified number of RFID tags 10 within a specified time interval (e.g., one RFID tag per minute). As another example, an operator can program the control electronics 214 to release one or more RFID tags 10 for a particular volume, such as for a particular number of bushels based on a harvester yield monitor.

Figure 9:
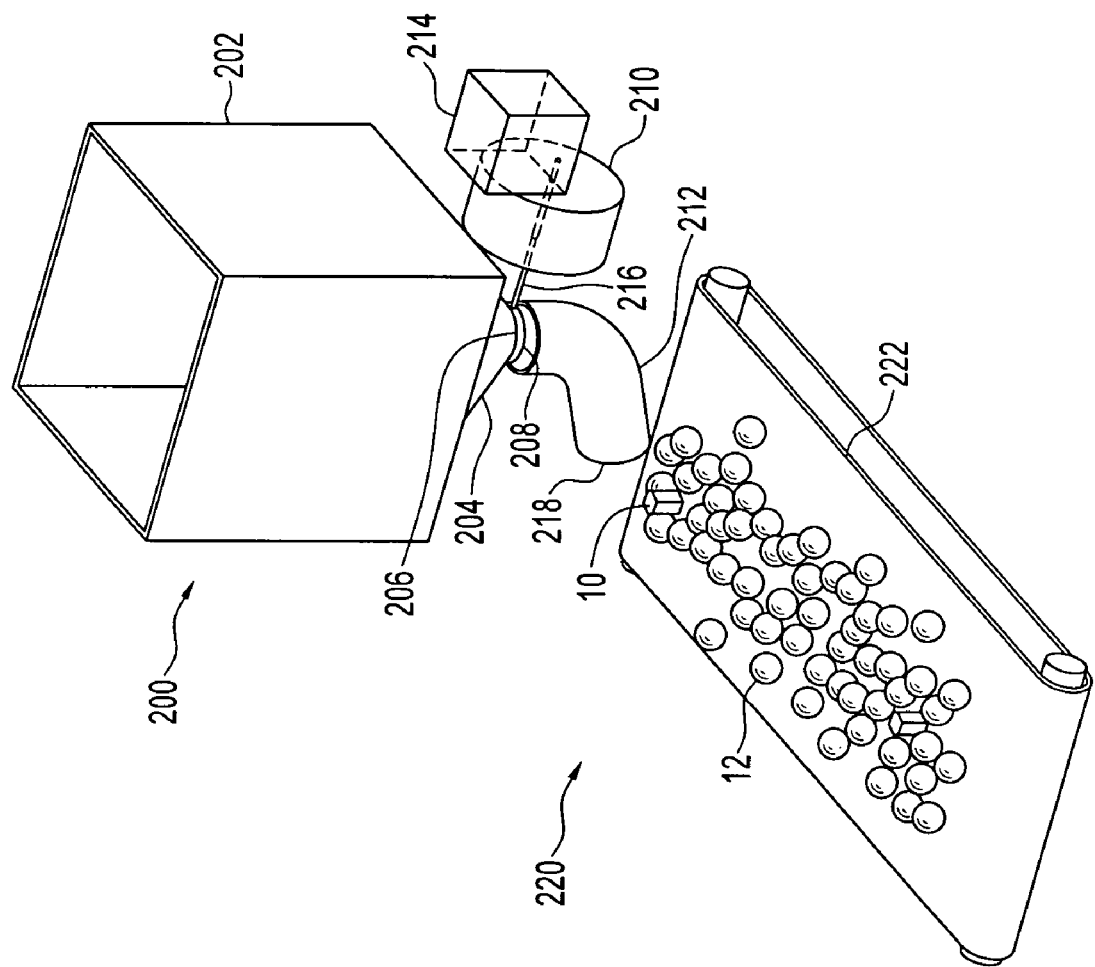
FIG. 9 shows the dispenser of FIG. 8 integrated into a belt-based grain handling system.
Figure 10:
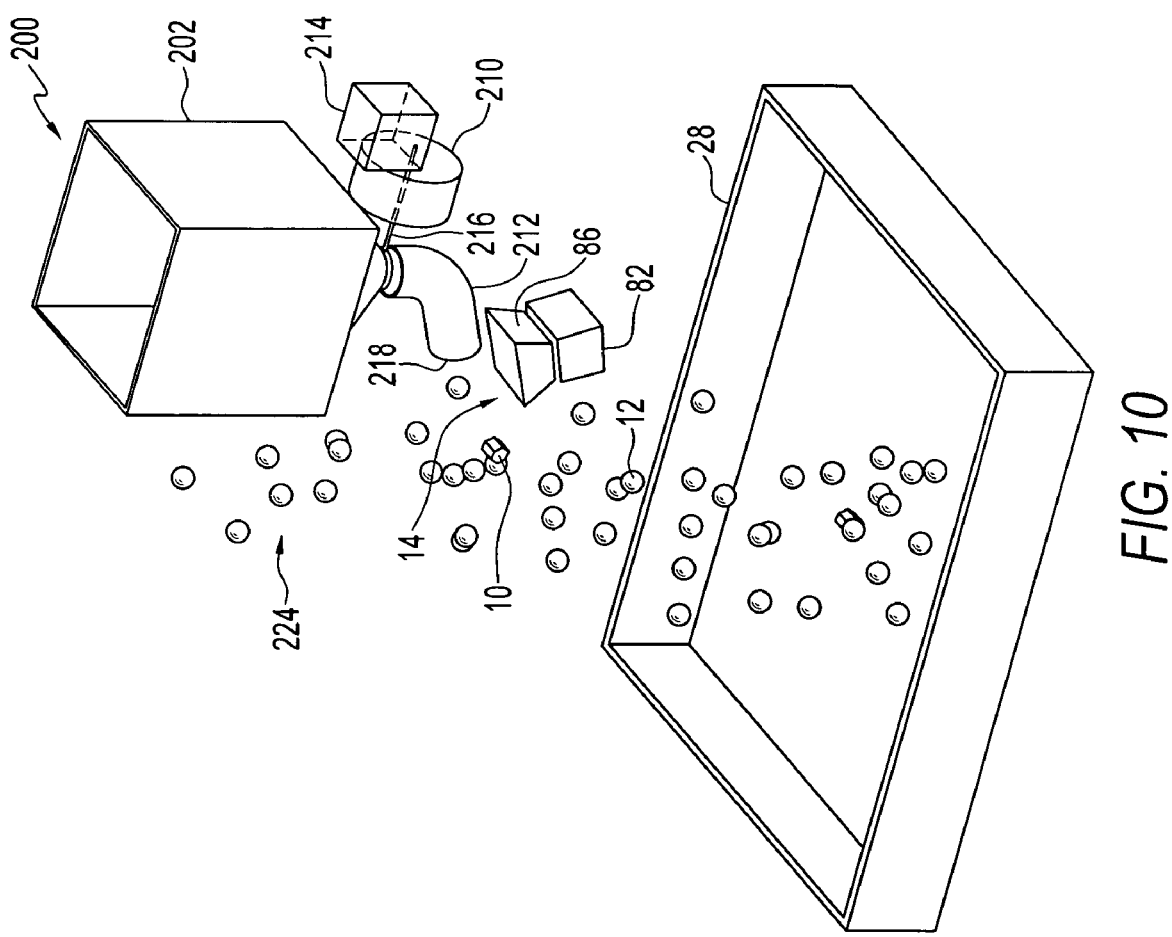
FIG. 10 shows the dispenser of FIG. 8 integrated into a free-falling grain collection system.

The tag dispenser 200 can be configured and positioned to dispense the RFID tags 10 into a stream of grain moved by a belt-based grain handling system, into a stream of freely falling grain (such as into a container), and/or into a stream of grain moved by an auger. For an exemplary belt-based grain handling system 220, as shown in FIG. 9, the tag dispenser 200 may be located above a belt 222, wherein the opening 218 of the tags guide 212 is directed towards the belt. Alternatively, for the case of a freely falling grain 224, as shown in FIG. 10, the tag dispenser 200 may be located next to free-fall volume into the container 28 and the opening 218 of the tags guide 212 may be directed towards the falling grain. The reader/writer 14 may be positioned to encode the RFID tag 10 or read from the RFID tags as they pass by the reader/writer. For an auger-based grain handling system, the tags guide 212 may be directly inserted into the auger pipe, for example, or may positioned above an auger intake system.

Figure 11:
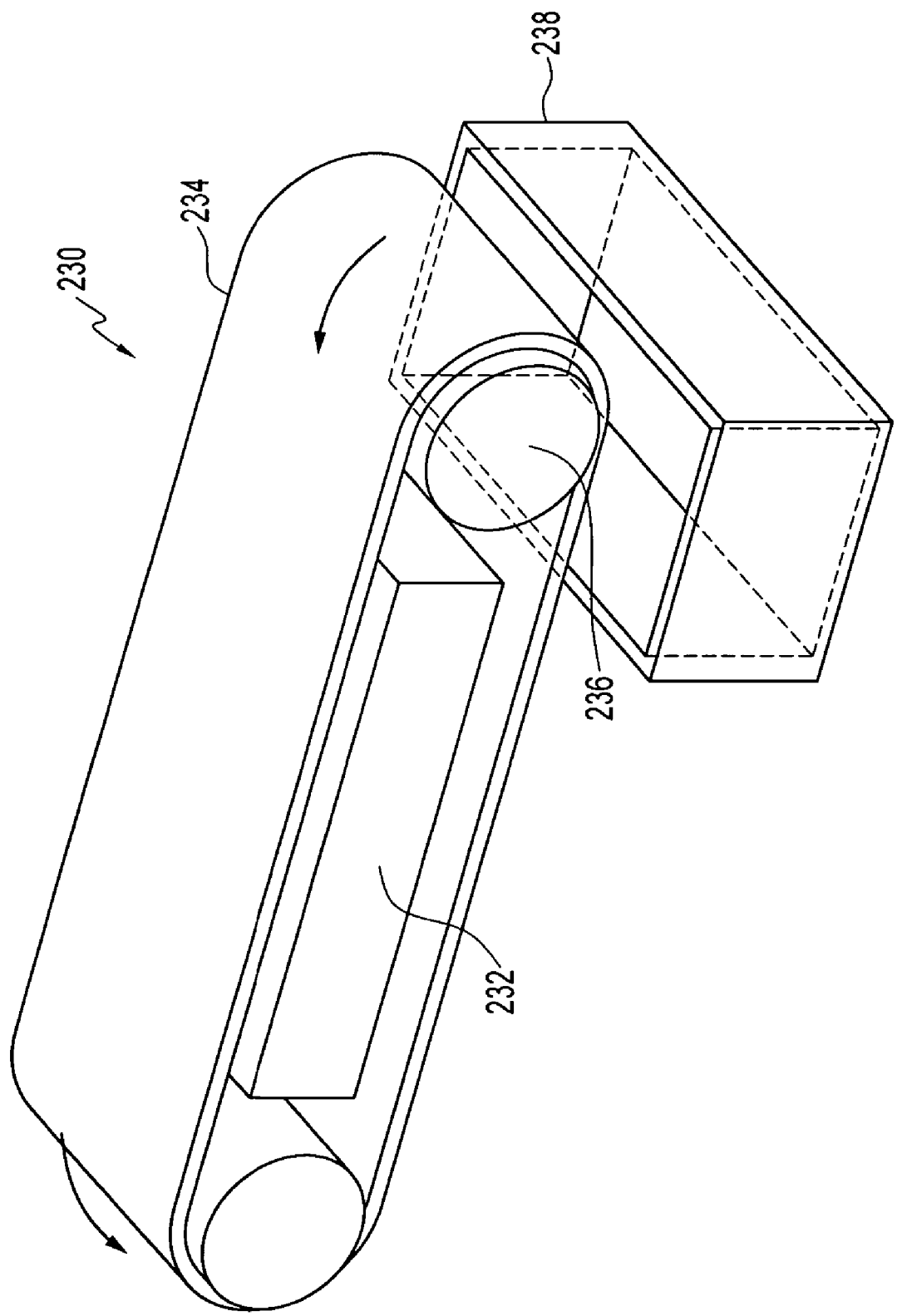
FIG. 11 shows an exemplary remover for RFID tags from surrounding grain, according to a preferred embodiment of the present invention.

In an exemplary embodiment of a device for extracting the RFID tags 10, according to another embodiment of the present invention, which utilizes the preferred magnetic component or portion of the RFID tag (such as, for example, a magnetic component of the casing), a magnetic tag remover 230 is provided. As shown in FIG. 11, the remover 230 includes a magnet, such as a permanent magnet or electromagnet 232 for attracting the RFID tags 10, a moving surface such as a moving belt 234 powered by an electrical engine 236, and a storage container (such as a box 238) for the RFID tags. The belt 234 preferably is disposed between the magnet 232 and the grain 12 from which the RFID tags 10 are to be removed, and most preferably is disposed within a loop of the belt.

The magnet 232 pulls up the RFID tags 10 using the magnetic component of the tags. The RFID tags 10 are then moved by the belt 234 to the storage container 238. Preferably, the storage container 238 is positioned at or past the edge of the magnet 232, thus allowing the captured RFID tags 10, once sufficiently displaced from the power of the magnet, to be immediately released into the storage container. The dimensions of the belt 234, the speed of the belt, and the required power of the magnet 232 may be defined, for example, by the particular deployment environment for extracting the RFID tags 10.

Figure 12:
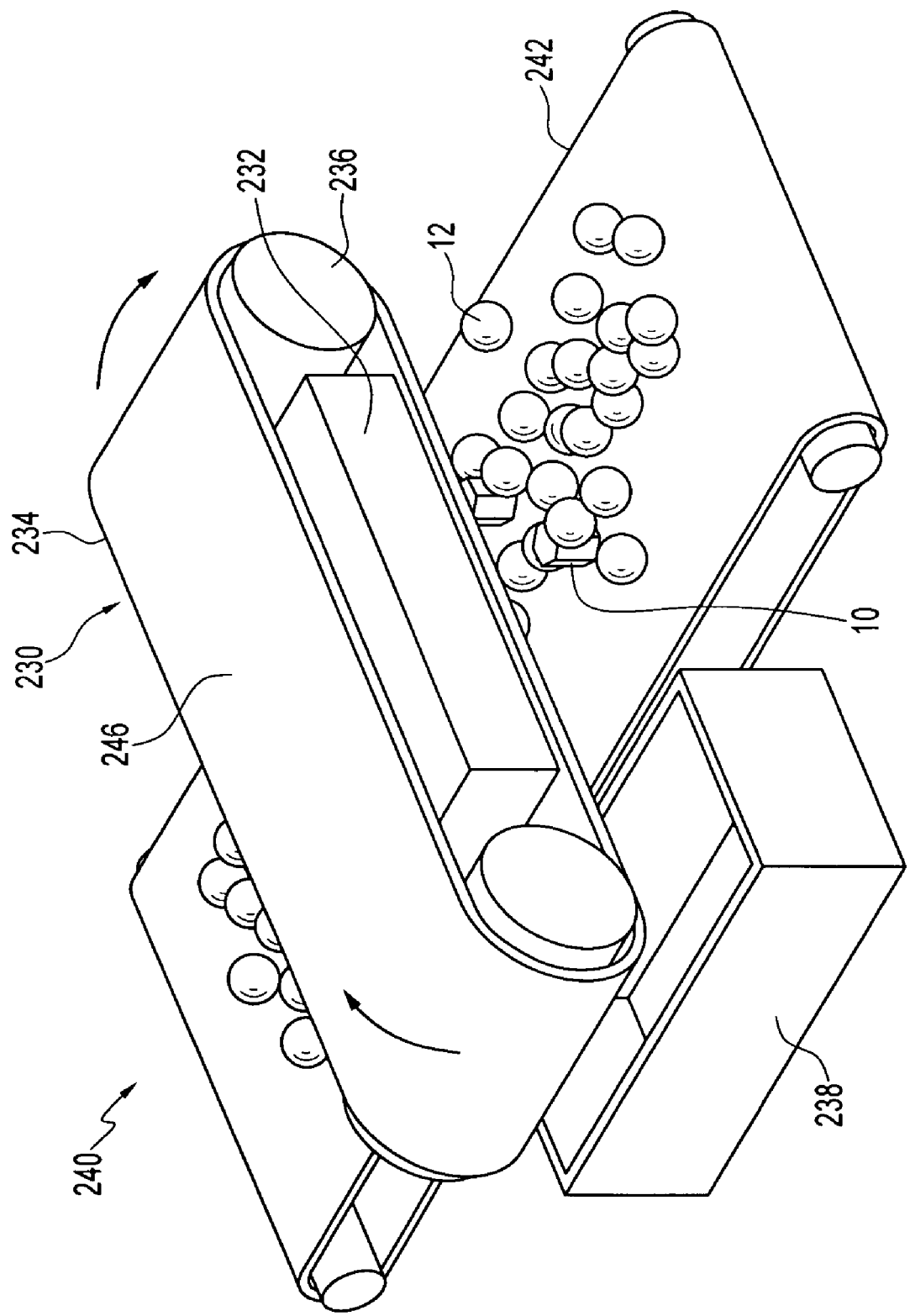
FIG. 12 shows the remover of FIG. 11 integrated into a belt-based grain removal system.
Figure 13:
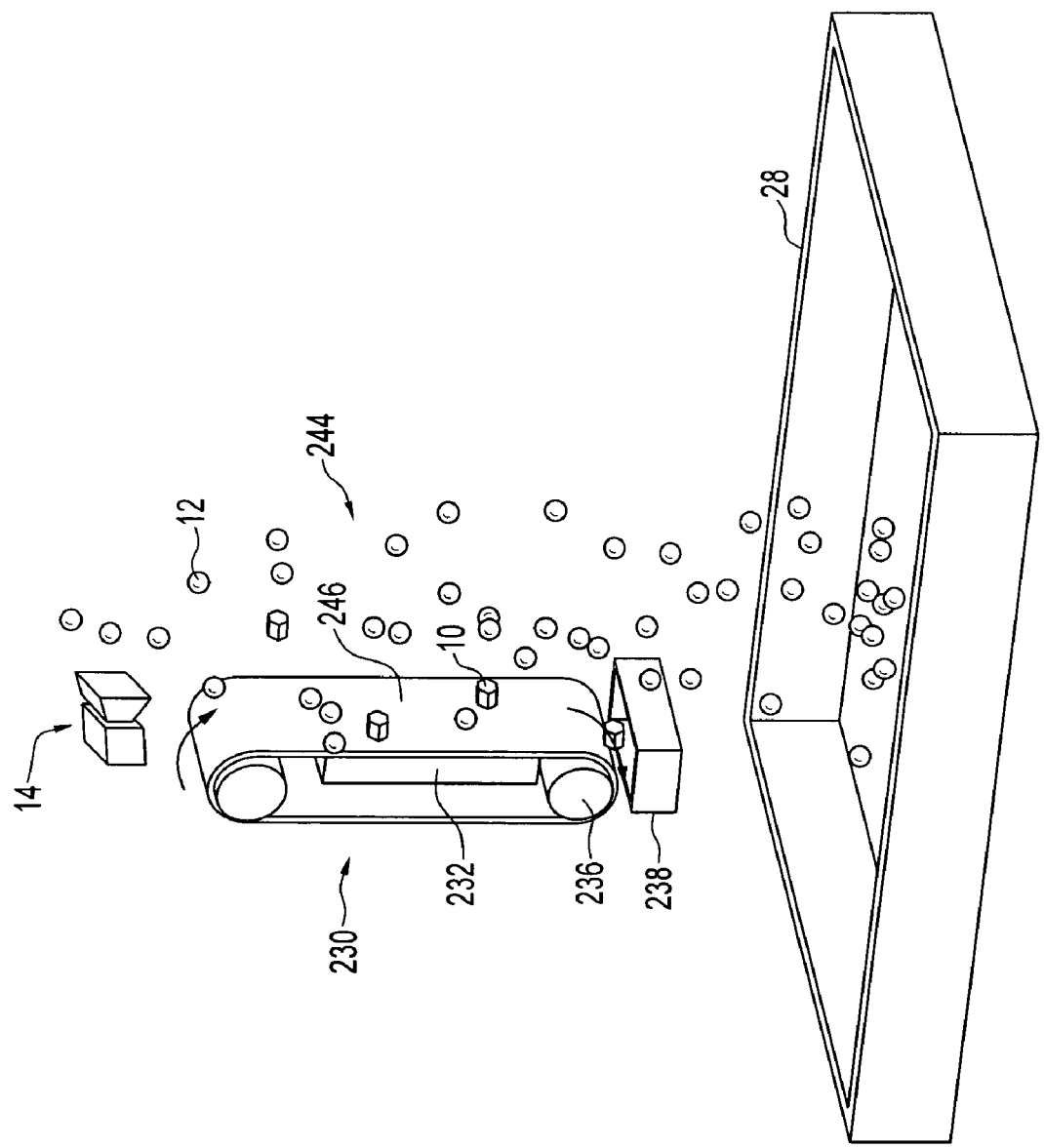
FIG. 13 shows the remover of FIG. 11 integrated into a free-falling grain collection system.

The remover 230 can be used, for example, to remove the RFID tags 10 from a stream of grain moved by a belt-based grain handling system and/or from a stream of falling grain. In an exemplary belt-based grain handling system 240, as shown by example in FIG. 12, the belt 234 of the remover 230 is positioned to face a grain belt 242 (as shown, above the grain belt), and the storage container 238 is located next to the grain belt. As shown in FIG. 13, in the case of falling grain (e.g., freely falling grain), the belt 234 of the remover 230 preferably is positioned to face a path of falling grain 244, and the storage container 238 is placed directly below the removing belt. In the embodiments shown in FIGS. 12–13, a moving surface 246 (i.e. the surface of the moving belt facing the grain 12) moves in a direction toward the storage container 238, thus moving the magnetically-extracted RFID tags 10 towards the storage container. When the RFID tags 10 are a sufficient distance from the magnet 232, the RFID tags freely fall or are directed into the storage container 238. For an auger-based grain handling system, the belt 234 of the remover 230 may be positioned, for example, just above an auger intake system.

While specific embodiments of the present invention have been shown and described, it is to be understood that other modifications, substitutions, and alternatives will be apparent to those of ordinary skill in the art. Such modifications, substitutions, and alternatives can be made without departing from the spirit and scope of the present invention, which should be determined from the appended claims.

Various features of the invention are set forth in the appended claims.

What is claimed is:

1. A tracking device for grain comprising:
   a radio-frequency identification (RFID) tag dimensioned to have a size approximating surrounding grain, said tag comprising a memory and an RF communication channel;
   data stored in said memory, said data comprising at least a time when said RFID tag was handled with surrounding grain and information sufficient to determine a location of handling at the time when said RFID tag was handled with the surrounding grain.

2. The tracking device of claim 1 wherein the information sufficient to determine a location of handling comprises global positioning satellite (GPS) coordinates.

3. The tracking device of claim 1 wherein said RFID tag is a passive electronic device.

4. The tracking device of claim 1 wherein the time comprises atomic time.

5. The tracking device of claim 1 wherein said RFID tag further comprises a unique identification code for said RFID tag.

6. The tracking device of claim 5 wherein the unique identification code is stored in a read-only memory of said RFID tag.

7. The tracking device of claim 1 wherein the information sufficient to determine a location of handling comprises at least one of an absolute location and an identification of a container.

8. The tracking device of claim 1 wherein the memory comprises a non-volatile read/write memory.

9. A system for tracking grain, the system comprising:
a tracking device according to claim 1; and
a writer for recording said data into the memory of said RFID tag.

10. The system of claim 9 wherein said writer encodes a data set in said RFID tag for each of a plurality of stages in processing of grain.

11. The system of claim 9 wherein said writer communicates with said RFID tag by sending electromagnetic signals.

12. The system of claim 9 wherein said RFID tag is a passive device, and wherein electromagnetic signals transmitted from said writer provide power for said RFID tag.

13. A system for tracking grain, comprising:
a tracking device according to claim 1; and
a dispenser for dispensing said RFID tag into a grain flow.

14. The system of claim 13 wherein said dispenser comprises:
a container for holding a plurality of RFID tags, said container including an opening;
a surface for selectively unblocking or blocking the opening to permit or block one or more RFID tags from exiting said container through the opening;
a device for selectively moving said surface.

15. The system of claim 14 wherein said surface is selectively positioned to cover the opening, and wherein said dispenser further comprises:
a connection between said surface and said device for selectively moving said surface.

16. The system of claim 15 wherein said connection comprises a rod, and wherein said device for operating said dispenser comprises a selectively operable apparatus for moving the rod, thus moving said surface to selectively cover or uncover the opening.

17. The system of claim 16 wherein the selectively operable apparatus comprises:
a solenoid;
a control for selectively applying a positive or negative current to said solenoid.

18. The system of claim 14 further comprising;
a guide for the RFID tags connected at one end to the opening, and having an opposing opening for dispensation of the RFID tags.

19. The system of claim 18 wherein said opposing opening is directed toward a belt of a belt-based grain handling system.

20. The system of claim 18 wherein said opposing opening is directed toward a container into which free-falling grain is directed.

* * * * *